United States Patent [19]

Spademan

[11] 4,406,073
[45] Sep. 27, 1983

[54] SPORT SHOE WITH A DYNAMIC TONGUE ASSEMBLY

[76] Inventor: Richard G. Spademan, 54 Lakeside Terrace, Incline Village, Nev. 89450

[21] Appl. No.: 237,348

[22] Filed: Feb. 23, 1981

Related U.S. Application Data

[63] Continuation-in-part of Ser. No. 109,611, Jan. 4, 1980, and a continuation-in-part of Ser. No. 104,283, Dec. 17, 1979, and a continuation-in-part of Ser. No. 104,282, Dec. 17, 1979, and a continuation-in-part of Ser. No. 50,436, Jun. 20, 1979.

[51] Int. Cl.³ .................... A43B 5/04; A43B 23/26
[52] U.S. Cl. ................................. 36/119; 36/54
[58] Field of Search ............. 36/117, 118, 119, 120, 36/121, 50, 54

[56] References Cited

U.S. PATENT DOCUMENTS

| | | | |
|---|---|---|---|
| 3,413,736 | 12/1968 | Spiteri | 36/54 |
| 3,561,139 | 2/1971 | Stillman | 36/119 |
| 4,160,332 | 7/1979 | Salomon | 36/119 |

Primary Examiner—Patrick D. Lawson
Attorney, Agent, or Firm—Townsend and Townsend

[57] ABSTRACT

A sport shoe (1, 50, 70) is described having a tongue assembly (15, 30, 35, 76) comprising an upper section (16, 31, 56, 83) and a lower section (17, 32, 37, 86). The upper and lower sections (16, 17, 31, 32, 35, 57, 85, 86) are movably coupled so that, as the upper section (16, 31, 56, 86) is moved toward the toe of the sport shoe (1, 50, 70), the lower portion of the upper section (16, 31, 56, 85) and the lower section (17, 32, 57, 86) press a foot rearwardly and downwardly toward a heel cup (5, 79) of the sport shoe (1, 50, 70).

44 Claims, 18 Drawing Figures

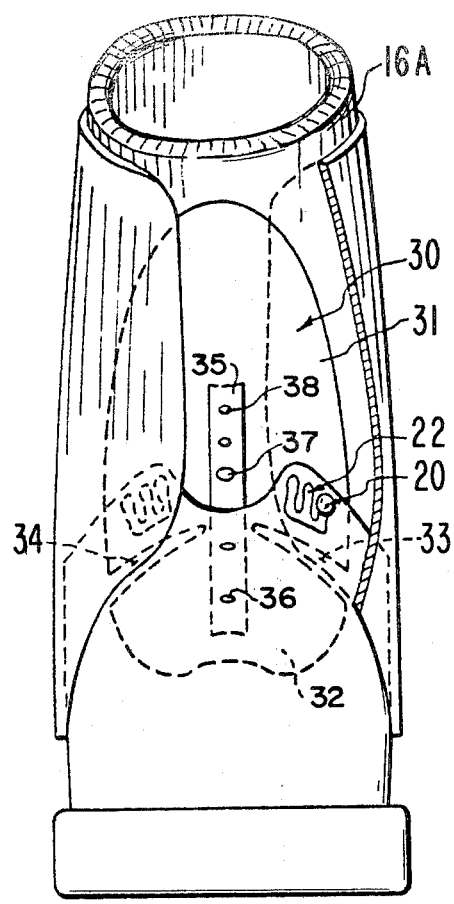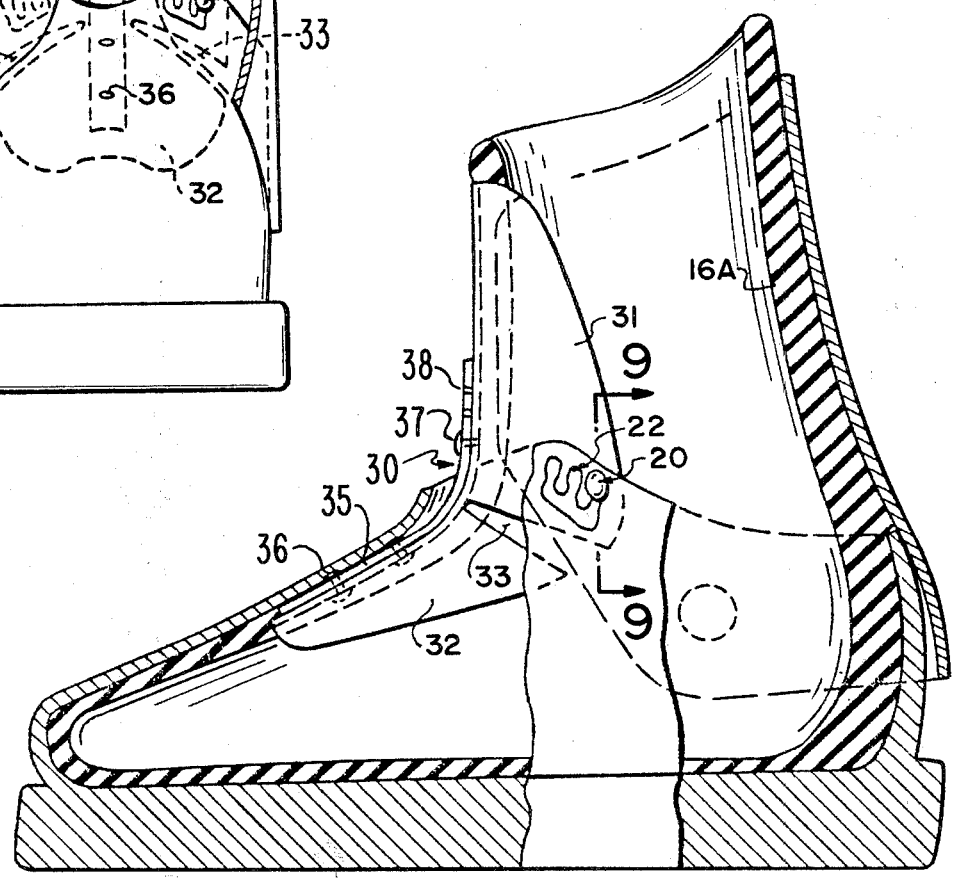

FIG. 10
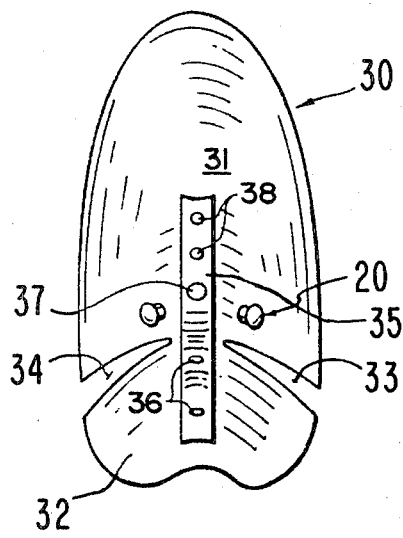
FIG. 11
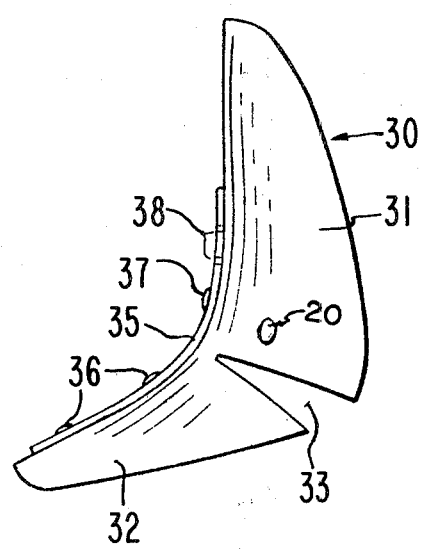
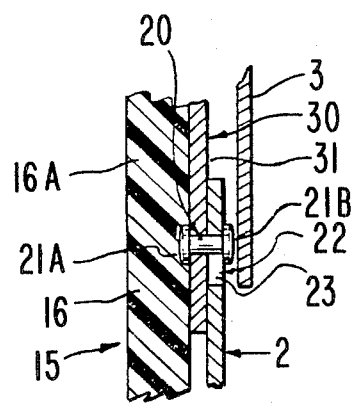
FIG. 9

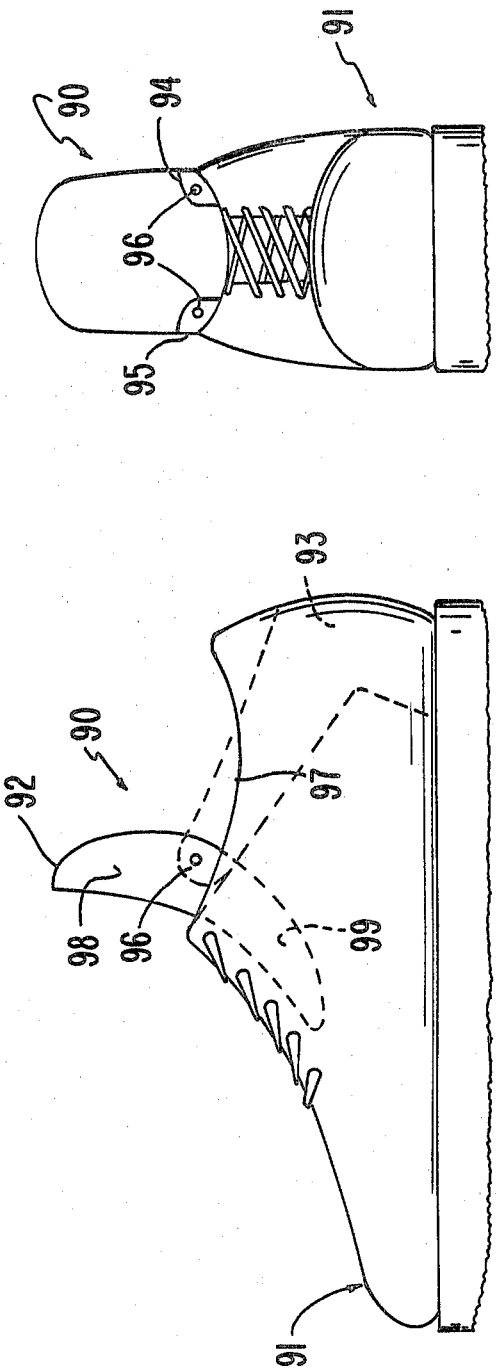

1

SPORT SHOE WITH A DYNAMIC TONGUE ASSEMBLY

RELATED APPLICATIONS

This is a continuation in part of applicant's application Ser. No. 109,611 filed Jan. 4, 1980 entitled "A Sport Shoe With A Dynamic Adjustable Cuff Assembly", applicant's application Ser. No. 104,283 filed Dec. 17, 1979 entitled "A Dynamic Internal Fitting System For A Sport Shoe", applicant's application Ser. No. 104,282 filed Dec. 17, 1979 entitled "Sport Shoe With Dynamic Tongue Assembly", and applicant's application Ser. No. 50,436 filed June 20, 1979 entitled "A Dynamic Internal Fitting System With A Movable Foot Bed For A Sport Shoe".

BACKGROUND OF THE INVENTION

The present invention relates to fitting systems for sport shoes in general and in particular to a novel fitting system for a ski boot or the like.

A conventional ski boot as presently used in downhill skiing comprises a relatively rigid exterior lower shell member, an upper cuff member and a relatively soft interior liner. The shell member and cuff member are designed to provide mechanical protection and support for a foot, ankle and lower leg and to provide a stable means for releasably securing the ski boot to a ski. Frequently, the shell member and the cuff member are pivotably coupled in the proximity of the ankle. Boots constructed with a pivoting cuff member generally provide restraint against excess sideways and rearward bending at the ankle while providing limited forward bending of the leg relative to the foot. Less commonly, boots are constructed without a pivoting cuff member and forward bending is restricted or accomplished by providing for a separation of the upper forward section of the cuff member.

The relatively rigid exterior lower shell member and upper cuff member in conjunction with the relatively soft interior liner, in addition to providing mechanical support, must also provide a restraint against upward, forward, rearward and sideways movement of the foot. This restraint is desirable to minimize foot discomfort and fatigue from recurring pressure areas and continual movement of the foot in the boot. It is also necessary to control the skis during various skiing maneuvers and in various terrain and snow conditions. Further, it is essential for minimizing foot movement in order to maximize energy transmission between the foot and the release binding in a potential injury-producing fall.

In practice, the magnitude of restraint required from one moment to the next will vary as the skiing conditions and the maneuvers being executed change. Ideally, the boot should provide for a close, though relatively loose, comfortable fit that provides circulation and warmth during the tracking phase of skiing while also providing for at least a momentary tighter fit during the turning phase or other forceful maneuvers of skiing.

Except for the inventions disclosed in applicant's previously filed applications, the design of conventional ski boots generally does not adequately compensate for the dynamic conditions that prevail in downhill skiing. With conventional boots, during a turn when skiing on packed snow, forward bending at the ankle is usually accompanied by a tendency for hindfoot upward movement and forefoot sideways movement because ski control and turning are usually accomplished by downward and sideways force applied to the forward leading edges of the skis. In powder snow, the forward leading edges are kept raised for planing on top of the snow with a tendency for forefoot upward and sideways movement. When maneuvering in snow of different consistencies or in bumpy or mogully terrain, the skier alternates, frequently and rapidly, between forward and rearward bending in the boots. As a result of this movement, ski control is significantly reduced. In most injury-producing fall conditions, excess movement of a foot in a boot also reduces energy transmission between the foot and the release binding.

Because shell molds are expensive to manufacture, it has been the practice to supply a limited number of shell sizes. Manufacturers then rely upon buckles with numerous and complex adjustments and liners of various configurations and constructions to provide a close, comfortable and warm fit, to compensate for innumerable foot sizes and shapes, and to achieve the necessary foot restraint. However, these fitting arrangements are generally unsatisfactory. The use of buckles with numerous and complex adjustments usually results in a nonconforming fit. The buckle closure required to provide a close fit usually results in uncomfortable pressure areas because of the consequent distortion of the relatively rigid shell. Additionally, conventional buckle arrangements usually do not adequately restrain the foot from sideways movement at the hindfoot and forefoot.

The use of liners of various configurations and constructions also frequently results in a nonconforming fit. Because of the difficulty in supplying liner configurations that will accommodate the wide range of variation of foot sizes and shapes such as a splay or wide forefoot, wide base, angulated heel, halux valgus, bony prominences, spurs, high longitudinal arch or one foot in size variance with the other foot, liners are generally manufactured to conform to only a limited range of size and shape. Manufacturers then rely upon various liner constructions to provide a close comfortable fit. Among the constructions used there are included molded and sheet foam rubber, urethane foam, wax, cork, plastic beads, and other various flow materials. The numerous materials used is indicative of the unsatisfactory results obtained.

In spite of the above fitting arrangements, conventional boots do not provide adequate adjustment for comfort and restraint and a relatively large inventory of many shells and liner configurations and constructions is necessary to satisfy customer requirements. Moreover, a satisfactory fit in the ski shop is still often unsatisfactory on the ski slope because the foot is not necessarily fitted for skiing conditions.

SUMMARY OF THE INVENTION

In view of the foregoing, a principal object of the present invention is a sport shoe and boot fitting system, and in particular a ski boot fitting system which reduces the number of shell sizes, liner configurations and constructions required to achieve a close, comfortable are warm fit, which provides necessary foot restraint over a wide range of foot sizes and foot shapes and which dynamically adjusts the fit of the boot to a lower extremity during all skiing maneuvers.

Another object of the present invention is a fitting system that requires only one adjustment to fit the boot to a foot.

Another object of the present invention is a fitting system that dynamically tightens the fit of the boot with forward lean and loosens the fit of the boot with rearward lean.

Still another object of the present invention is a fitting system of the type described above in which the principal means for dynamically adjusting the fit of the boot is a movable tongue assembly comprising an upper section and a lower section, means for movably coupling the lower section to the upper section and means for movably coupling the upper section to the boot.

Still another object of the present invention is a fitting system comprising a movable tongue assembly as described above with means adjustably coupling the tongue assembly to the boot for adjusting the fit of the boot to different sized feet.

Still another object of the present invention is a fitting system comprising a movable tongue assembly as described above with means for adjustably attaching the tongue assembly to the instep of a ski boot.

Still another object of the present invention is a fitting system comprising a movable tongue assembly as described above and a heel cup assembly. The heel cup assembly is attached to the heel of the ski boot. The tongue assembly is movably attached to strap members extending from the heel cup assembly.

In use, during forward lean, the upper section is rotated toward the toe of the boot about a pivot axis formed by the means provided for coupling the upper section to the boot. As the upper section is pivoted forwardly, a lower portion of the upper section and the lower section are pivoted rearwardly and downwardly for pressing a lower extremity rearwardly and downwardly toward the heel of the boot. In one embodiment, the upper and lower sections are movably coupled at the lateral edges thereof and, in an alternative embodiment, the upper and lower sections are pivotably coupled at the midpoint thereof.

BRIEF DESCRIPTION OF THE DRAWING

The above and other objects, features and advantages of the present invention will become apparent from the following detailed description of the accompanying drawing in which:

FIG. 7 is a cross-sectional view of a ski boot incorporating an alternative tongue assembly according to the present invention.

FIG. 8 is a front elevation view of FIG. 7.

FIG. 9 is a partial cross-sectional view taken along lines 9—9 of FIG. 7.

FIG. 10 is a front view of the tongue assembly of FIGS. 7 and 8.

FIG. 11 is a side view of FIG. 10.

FIG. 16 is a side elevation view of another embodiment of the present invention.

FIG. 17 is a front view of FIG. 16.

DETAILED DESCRIPTION OF THE DRAWING

Figure 1:
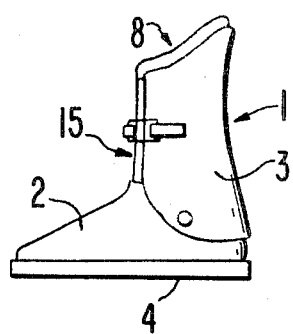
FIG. 1 is a side elevation view of a ski boot according to the present invention.
Figure 5:
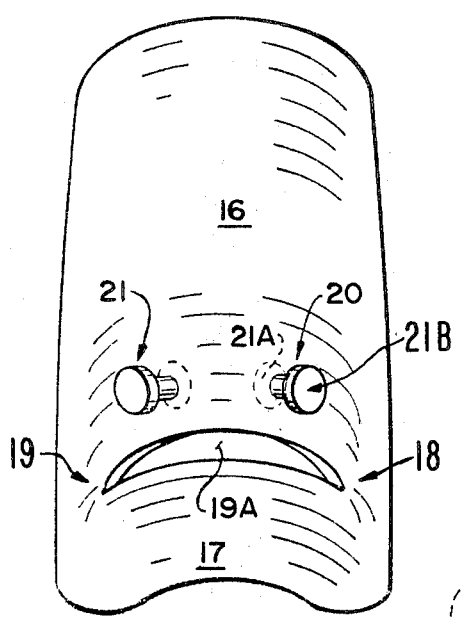
FIG. 5 is a front elevation view of the tongue assembly shown in FIGS. 2 and 3.

Referring to FIGS. 1-6, there is provided in accordance with the present invention a ski boot designated generally as 1. In the ski boot 1 there is provided a lower shell member 2 and an upper cuff member 3. The lower shell member 2 is provided with a sole portion 4, a heel cup 5 and a forward overlying portion 6 for covering and protecting the forward portion and toes of a foot enclosed thereby.

Figure 2:
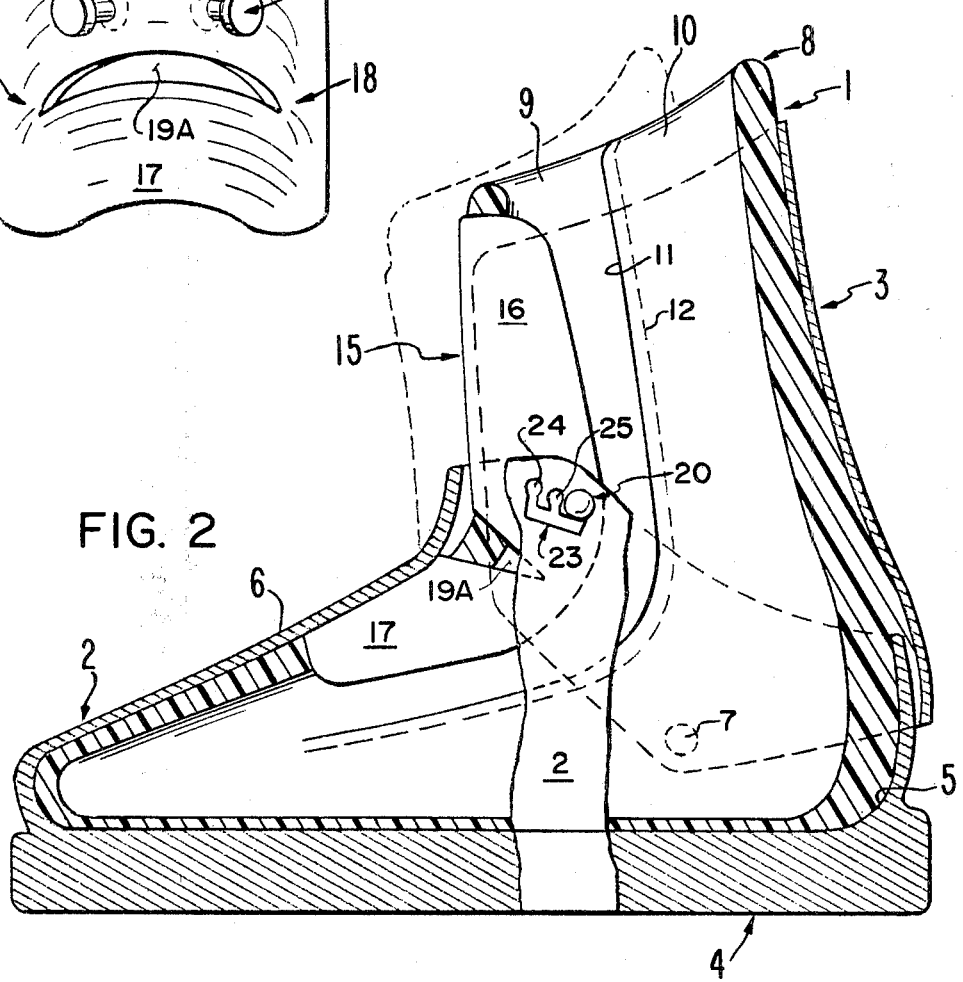
FIG. 2 is a cross-sectional view of a tongue assembly in a ski boot according to the present invention.
Figure 3:
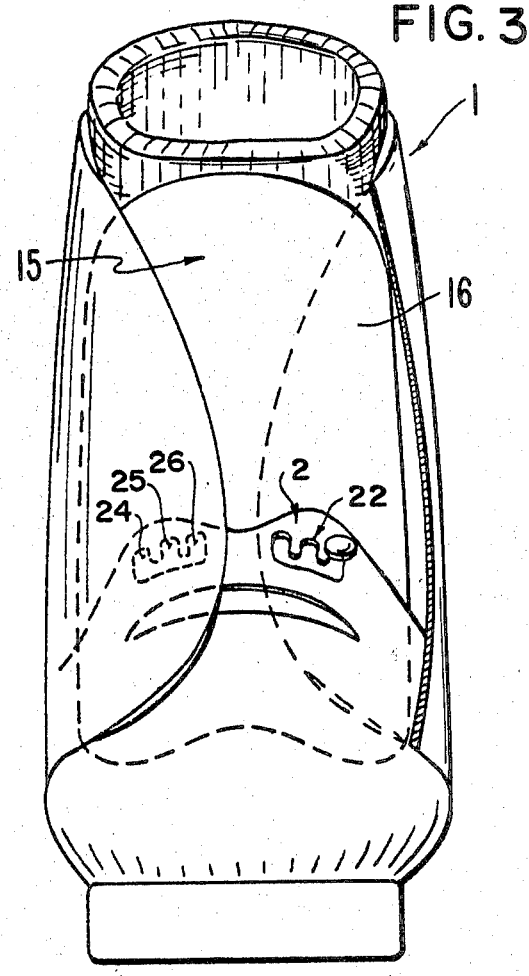
FIG. 3 is a front elevation view of FIG. 2.
Figure 4:
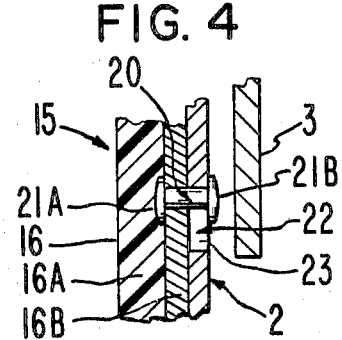
FIG. 4 is a transverse cross-sectional view of the coupling assembly coupling the tongue assembly to the boot.

The cuff member 3 is pivotably coupled to the shell member 2 as by a rivet or the like 7. In a closed position it may move from a position as shown in FIG. 2 to a position approximately twenty degrees forward of a vertical line extending through the rivet 7 perpendicular to the plane of the sole portion 4 of the lower shell member 2. The cuff member 3 is restrained from pivoting rearwardly by the overlap of the front of the cuff member 3 on the lower shell member 2.

For warmth and comfort there is provided, extending throughout the interior of the shell member 2 and cuff member 3, a liner designated generally as 8. The liner 8 is provided with a forward section 9 and a rearward section 10. The forward section 9 and the rearward section 10 are split along a lateral line designated generally as 11 for facilitating the entry of a foot into the boot. To insure warmth and a close comfortable fit, the liner sections 9 and 10 are slightly overlapped, as shown by the dotted line at 12.

Immediately behind the instep portion of the boot, there is provided a movable tongue assembly designated generally as 15. In the tongue assembly 15 there is provided an upper section 16 and a lower section 17. The lower section 17 is movably coupled to the upper section 16 at a first point 18 and at a second point 19 located intermediate said sections 16 and 17 and near the right and left lateral edges thereof. The shape of the lower section 17 is such that it extends over a substantial portion of the instep and forefoot for minimizing forward and sideways movement of a foot.

The upper and lower sections 16 and 17 are coupled at points 18 and 19 by resilient material used in fabricating the upper and lower sections. Alternatively, they may be pivotably coupled as by a rivet with other suitable means being provided for providing a resilient coupling between the two sections.

In addition to being resiliently coupled, upper and lower sections 16 and 17 are separated by a clearance space designated generally as 19a along a line extending from the first point 18 over the instep portion thereof to the second point 19. The separation between the upper and lower sections 16 and 17 comprises a predetermined distance along a line extending from the midpoint of the lower edge of the upper section and the midpoint of the upper edge of the lower section, which predetermined distance corresponds to a predetermined maximum distance of movement of said upper section 16 toward the toe of said boot relative to said lower section 17.

Figure 4A:
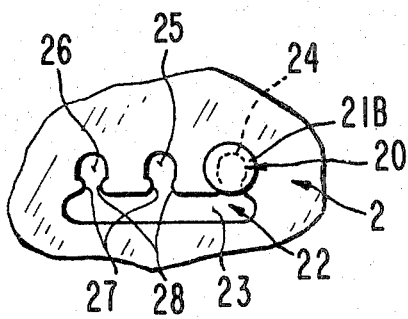
FIG. 4A is a partial enlarged elevation view of a tongue-adjusting slot according to the present invention.

To movably couple the tongue assembly 15 to the boot 1, the upper section 16 is coupled to the lower shell member 2 by means of a pair of rivet-type pin members 20 and 21. For adjusting the position of the tongue assembly 15 relative to the heel cup 5, the pin members 20 and 21 are each provided with an internal head 21a and an external head 21b for fixedly attaching the upper section 16 in a tongue-adjusting slot designated generally as 22. The tongue-adjusting slot 22 is provided with a lower elongated slot portion 23 and a plurality of shorter slot portions 24, 25 and 26 extending generally upwardly and vertically therefrom. Each of the slot portions 24, 25 and 26 are provided with a pair of inwardly projecting wall portions 27 and 28. As seen more clearly in FIG. 4A, the inwardly projecting wall portions 27 and 28 are provided for securing the pins 20 and 21 in the slots 24, 25 and 26. The heads 21b on the ends of the pins 20 and 21 prevent the pins 20 and 21 from being withdrawn inwardly from the slots 24–26.

Typically, the upper and lower sections 16 and 17 of the tongue assembly 15 are fabricated with a padding 16a of a relatively soft interior foam-like material and a relatively rigid exterior shell 16b to which the interior padding 16a is affixed.

Figure 6:
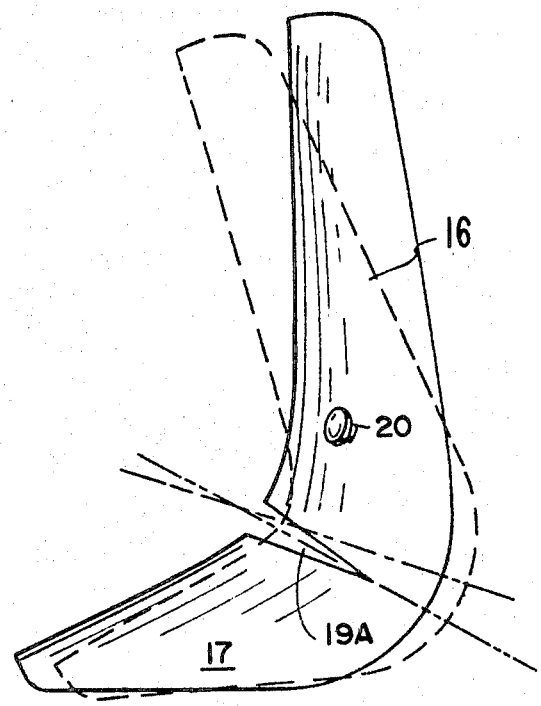
FIG. 6 is a side elevation view of the tongue assembly of FIG. 5.

Referring to FIG. 6, during forward lean the upper section 16 is pivoted about the axis of the pin members 20 and 21 toward the toe of the boot 1. As shown by the broken lines, as the upper section 16 is pivoted toward the toe of the boot 1, a lower portion of the upper section 16 and the lower section 17 are pivoted rearwardly and downwardly for pressing a lower extremity rearwardly and downwardly toward the heel cup 5 at the lower rear end of the shell 2. Alternatively, the lower section 17 can be removed so that the lower portion of the upper section 16 can pivot rearwardly in conjunction with the upwardly pivoting foot bed as disclosed in Ser. No. 50,436 for pressing a leg and a foot torward the heel cup. During rearward lean the upper section 16 and lower section 17 are rotaed in the opposite direction to relieve pressure from the leg and foot. The space 19a between the upper and lower sections 16 and 17 provides a clearance for permitting the pivoting of the upper and lower sections 16 and 17 together during forward lean.

To adjust the tongue for different sized feet, the pins 20 and 21 are moved from one of the slots 24, 25 and 26 to another of the slots by pushing the pins past the wall portions 27 and 28 and into the slot 23. When the desired fit is achieved, the pins are again pushed past the wall sections 27 and 28 into the desired slot.

Thus, the ski boot provides for a close fit during the tracking phase of skiing while providing for a momentary tightening during the turning phase or other forceful maneuvers of skiing.

Referring to FIGS. 7–11, there is provided in another embodiment of the present invention an alternative movable tongue assembly designated generally as 30. For clarity, features of FIGS. 7–11 which are identical to features shown in FIGS. 1–6 bear the same identifying notation.

In the tongue assembly 30 there is provided an upper section 31 and a lower section 32. The upper and lower sections 31 and 32 are movably resiliently coupled at the midpoint of the upper edge of said lower sectin 32 and the lower edge of said upper section 31. Extending from said midpoint to the lateral edges thereof, the upper and lower sections are split so as to provide a pair of clearance spaces 33 and 34 between the upper and lower sections 31 and 32.

Along the midline of the upper and lower sections 31 and 32, the sections 31 and 32 are resiliently coupled by means of a resilient spring-like member 35. The spring-like member 35 is coupled to the lower section 32 by means of one or more lower attaching members, such as a rivet 36. Similarly, the upper end of the member 35 is attached to the upper section 31 by means of a removable attaching member such as a spring screw 37. As seen in FIG. 10, above the spring screw 37 there is provided one or more holes 38. The holes 38 are provided for moving the location of the spring screw 37 for changing the force required to change the shape of the resilient member 35.

As in the tongue assembly 15, the tongue assembly 30 is provided with a pad 16a comprising an interior padded foam-like material and an exterior rigid shell 16b to which the padded material is attached. For attaching the upper section 21 to the shell 2, the upper section 31 is provided with a pair of pin members 20 and 21 for fitting in a slot 22 provided therefor in the shell 2 as described above with respect to the embodiment of FIGS. 1–4.

In use, except for the fact that the upper and lower sections 21 and 32 of the embodiment of FIGS. 7–11 move about an axis through the midpoint of the tongue sections rather than about an axis through the lateral edges thereof, a movement of the upper section 31 causes a corresponding rearward and downward movement of the lower section 32 for pressing a lower extremity downwardly and rearwardly toward the heel cup 5 as described above with respect to the embodiment of FIGS. 1–4.

Figure 13:
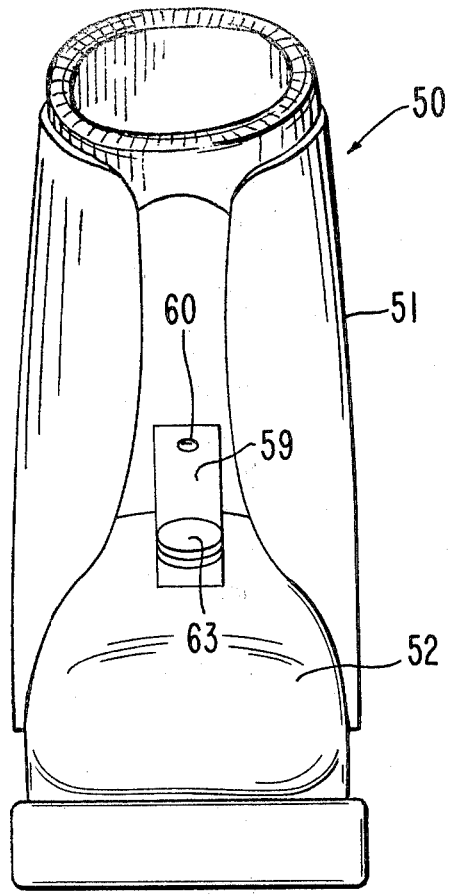
FIG. 13 is a front view of FIG. 12.
Figure 12:
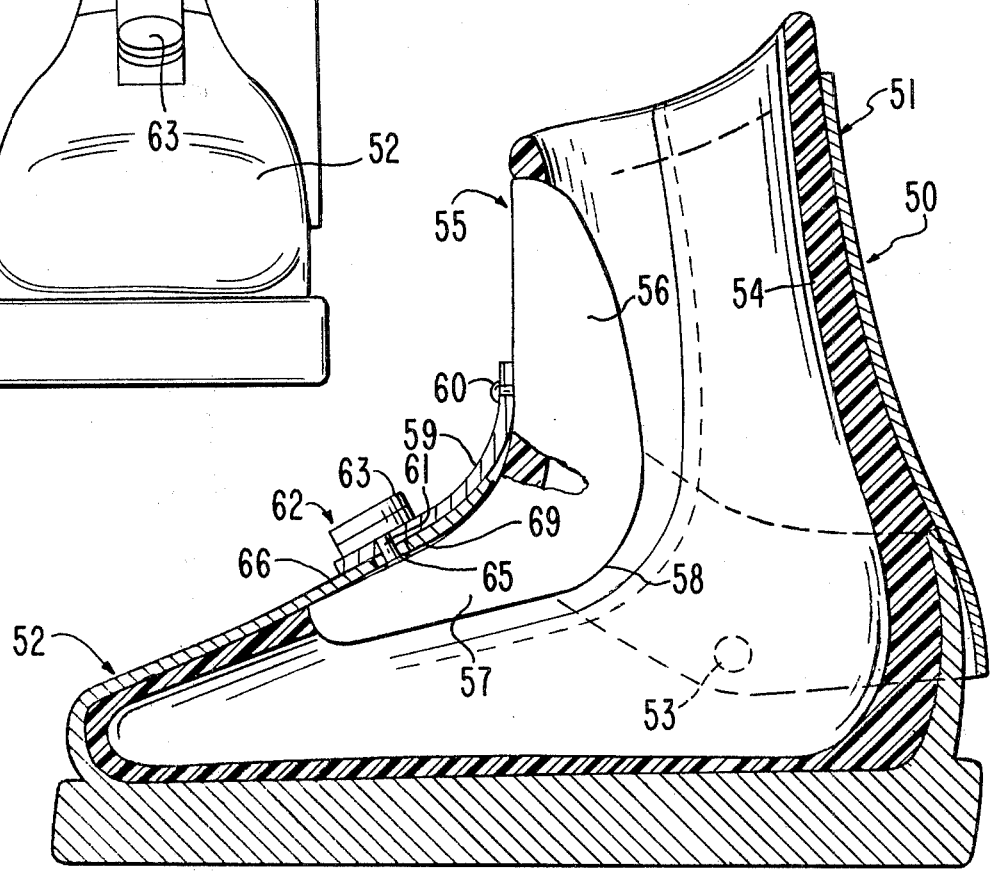
FIG. 12 is a cross-sectional view of an alternative embodiment of the present invention.

Referring to FIGS. 12 and 13 there is provided in another embodiment of the present invention a ski boot designated generally as 50. In the ski boot 50 there is provided a movably cuff member 51 and a substantially rigid lower shell member 52. The cuff member 51 is movably attached to the shell member 52 for forward and rearward movement about an axis 53. In the interior of the cuff member 51 and the shell member 52 there is provided a relatively soft resilient liner 54. The liner 54 is provided for providing warmth and comfort. In the vicinity of the instep of the ski boot 50 there is provided a movable tongue assembly 55.

In the tongue assembly 55 there is provided an upper section 56 and a lower section 57. The sections 56 and 57 are movably coupled by an intermediate section 58. At a point near its lower end, the upper section 56 is attached to the upper end of an extended tongue member 59, as by a rivet 60. In its lower end there is provided in the extended tongue member 59 a slot 61. Inserted in the slot 61 there is provided a tongue adjustment knob and shaft assembly designated generally as 62.

In the assembly 62 there is provided an adjusting knob 63, a shaft 64 and a retaining flange 65. The shaft 64 is provided to pass through the slot 61 and through a hole provided therefor in an instep portion 66 of the lower shell member 52. The flange 65 cooperates with the knob 63 to tighten the member 59 to the instep portion 66.

To adjust the position of the tongue assembly 55 relative to the instep portion 66, the knob 63 is first loosened. When the knob 63 is sufficiently loosened, the tongue assembly 55 is moved upwardly or downwardly relative to the instep portion 66 as required to loosen or tighten the fit of the boot 50 relative to a lower extremity therein. When the tongue assembly 55 is moved to its desired position relative to the instep portion 66, the knob 63 is tightened for holding the tongue assembly 55 in the desired position. Accordingly, when the tongue assembly 55 is moved downwardly relative to the instep portion 66, an underlying leg and foot engaged thereby is pushed downwardly and rearwardly toward the heel of the ski boot 50. On the other hand, when the movable tongue assembly 55 is moved upwardly relative to the instep portion 66, the fit of the ski boot 50 is loosened.

Except as described above with respect to the manner in which the tongue assembly 55 is adjustably attached to the instep portion 66 of the boot 50, the movable tongue assembly 55 is substantially identical to and functions in the same manner for causing a rearward and downward movement of the lower section toward the heel of the boot 50 with forward movement of the upper section 56 as described above with respect to the tongue assembly 15 of FIGS. 1-6.

Figure 15:
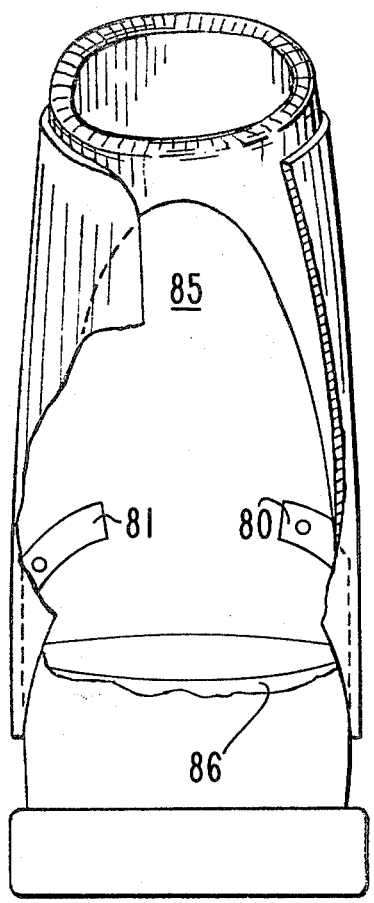
FIG. 15 is a partially cut-away front view of FIG. 14.
Figure 14:
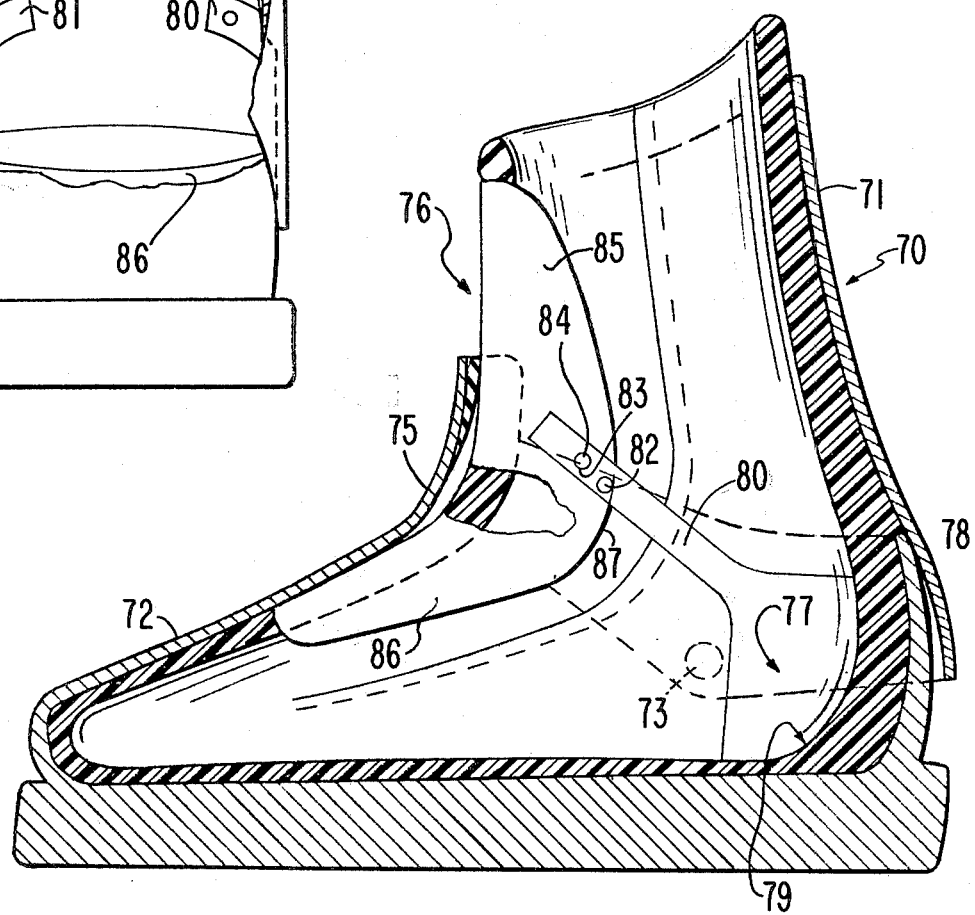
FIG. 14 is a cross-sectional view of still another embodiment of the present invention.

Referring to FIGS. 14 and 15, there is provided in still another embodiment of the present invention a ski boot designated generally as 70. In the ski boot 70 there is provided a movable cuff member 71 and a substantially rigid lower shell member 72. The cuff member 71 is movably coupled to the shell member 72 for movement about an axis designated 73. In the interior of the cuff member 71 and the shell member 72 there is provided for warmth and comfort a relatively soft, resilient liner 74.

In the vicinity of an instep 75 of the boot 70 there is provided a movable tongue assembly designated generally as 76. In the tongue assembly 76 there is provided an upper section 85 and a lower section 86 movably coupled together by an intermediate section 87.

In a heel portion 77 of the boot 70 there is provided a heel receiving member or cup 78. The heel receiving member 78 is attached to the heel portion 77 of the boot 70 as by rivets, cement or the like as at a point 79.

For movably attaching the tongue assembly 76 to the heel cup 78, there is provided extending from the heel cup 78 a pair of elongated strap members 80 and 81. At the upper ends of the strap members 80 and 81 there is provided a plurality of holes 82 and 83. The holes 82 and 83 are each provided for receiving a fitting member 84 extending laterally from the tongue assembly 76.

Unlike the embodiments of FIGS. 1-11 in which the movable tongue assembly is coupled to the instep of the boot or a forward portion of the lower shell member, the movable attachment of the tongue assembly 76 to the heel cup 78 improves the fit of the ski boot in the vicinity of the heel when tension is applied to the strap members 80 and 81 by a movement of the tongue assembly 76.

In use, during forward lean when the upper section 85 of the tongue assembly 76 is moved forwardly relative to the lower section 86, the strap members 80 and 81 movably attached to the lower portions of the upper section 85 are pulled taut. As the straps 80 and 81 are pulled taut, the heel receiving member 78 squeezes the heel thereby restraining upward movement of the heel from the heel receiving member 78.

Referring to FIGS. 16 and 17 there is provided in another embodiment of the present invention a tongue and heel cup assembly designated generally as 90. The assembly 90 is provided for use in a conventional walking or jogging shoe designated generally as 91.

In the assembly 90 there is provided an elongated, curved tongue member 92 and a heel cup 93. The rear of the heel cup 93 is formed with a cup shape to receive a wearer's heel and is attached to the heel or rear of the shoe 91 as by cement, rivet means or the like and to the tongue member 92 by means of a pair of strap members 94 and 95. The strap members 94 and 95 are attached to the tongue member 92 by any suitable means such as rivets 96.

Along its upper margin, the shoe 91 is provided with a curved cuff 97.

The tongue member 92 is provided with an upper portion 98 and a lower portion 99. The upper portion 98 is formed to comfortably embrace the lower part of the shin of the wearer. The lower part 99 is formed to comfortably embrace the instep of the wearer's foot.

When the assembly 90 is inserted in the shoe 91, the heel cup 93 is located in the heel of the shoe 91 with the strap members 94 and 95 extending upwardly toward the forward upper margin of the cuff 97. The upper portion 98 of the tongue member 92 extends above the cuff 97. The lower portion 99 extends into the interior of the shoe 91 beneath the instep portion of the shoe.

In use, as the lower extremity of a wearer is moved forwardly the upper portion 98 of the tongue member 92 is moved forwardly about the rivet 96. As the upper portion 98 is moved forwardly about the rivet 96 the lower portion 99 of the tongue member 92 presses downwardly and rearwardly the instep of the wearer's foot. As the lower portion 99 presses downwardly and rearwardly on the instep of the wearer's foot, the foot is pressed downwardly and rearwardly into the heel cup 93 thereby providing a momentary tightening of the fit of the shoe 91 as the tongue assembly 90 is moved in response to the movement of said lower extremity.

While multiple embodiments of the present invention are described, it is contemplated that still other changes and modifications to the embodiments will occur to those skilled in the art and may be made thereto without departing from the spirit and scope of the present invention. Accordingly, it is intended that the embodiments described be used only for purposes of illustrating the invention and that the scope of the invention should be determined only by reference to the claims hereinafter provided and their equivalents.

What is claimed is:

1. A sport shoe comprising:
    a movable tongue assembly for engaging a lower extremity; and
    means limiting the movement of a first portion of said tongue assembly so that a predetermined motion of the lower extremity correspondingly moves a second portion of the tongue assembly towards the lower extremity for momentarily tightening the fit of said shoe in response to said motion of said lower extremity.

2. A sport shoe according to claim 1 wherein said tongue assembly comprises:
    an upper section defining a third portion of the tongue assembly which wraps around an anterior part of said lower extremity and a lower section defined by the second portion of the tongue assembly which extends about an instep portion thereof; and
    wherein the limiting means includes means for movably coupling said upper section to said sport shoe for movement of said upper section toward and away from the toe of said sport shoe so that said upper and said lower sections cooperate in dynamically pressing said lower extremity toward the heel of said sport shoe as said upper section is moved toward the toe of said sport shoe.

3. A sport shoe according to claim 1 wherein said lower extremity comprises a foot; and means forming a heel receiving member for receiving the heel of said foot; and means for attaching said tongue assembly to said heel receiving member.

4. A sport shoe according to claim 1 wherein said attaching means comprises means for adjustably limiting said tongue assembly to said sport shoe.

5. A sport shoe according to claim 1 wherein said sport shoe is provided with means forming an instep and said limiting means comprises means for adjustably attaching said tongue assembly to said instep means.

6. A shoe according to claim 2 wherein said upper and said lower sections are separated along a line extending from a first point located intermediate said sections and near the left lateral edge thereof, over the instep part thereof, to a second point located intermediate said sections and near the right lateral edge thereof and said means for coupling said upper and said lower sections comprises means for coupling said sections at said first and said second points.

7. A sport shoe according to claim 2 wherein said means for movably coupling said upper section to said sport shoe comprises means for adjusting the location of said coupling of said upper section to said sport shoe.

8. A shoe according to claim 2 wherein said upper and said lower sections are separated along a line extending from the midpoint of the upper edge of said lower section and the lower edge of said upper section to the right and left lateral edges thereof, and said means for coupling said upper and said lower sections comprises means for coupling said sections at said midpoint.

9. A sport shoe according to claim 3 comprising: means forming a footbed; and
means for attaching said heel receiving means to said footbed.

10. A sport shoe according to claim 3:
wherein said tongue assembly limiting means comprises means for movably attaching said tongue assembly to said footbed.

11. A sport shoe according to claim 5 wherein said adjustable attaching means comprises an elongated member;
means for attaching said tongue assembly to said elongated member; and
means for attaching said elongated member to said instep means.

12. A sport shoe according to claim 5 wherein said means for adjustably attaching said tongue assembly to said instep means comprises means forming a slot for adjusting the position of said tongue assembly relative to said instep means.

13. A shoe according to claim 6 wherein said means for coupling said upper and said lower sections at said first and said second points comprises means for resiliently coupling said upper and said lower sections so that, as said upper sections is moved toward said toe of said shoe, a foot engaged by said lower section will be pressed downwardly and rearwardly by said lower section with a resilient force corresponding to the force of said resilient coupling means.

14. A shoe according to claim 6 wherein said separation between said upper and said lower sections comprises a predetermined distance along a line extending from the midpoint of the lower edge of said upper section and the midpoint of the upper edge of said lower section, which predetermined distance corresponds to a predetermined clearance for movement of said upper section toward the toe of said shoe relative to said lower section.

15. A sport shoe according to claim 7 wherein said means for movably coupling said upper section to said sport shoe comprises pin means extending from said upper section through holes provided therefor in said sport shoe and said adjusting means comprises means for adjusting the location of said pin means in said holes.

16. A shoe according to claim 8 wherein said means for coupling said upper and said lower sections at said midpoint comprises means for resiliently coupling said upper and said lower sections so that, as said upper section is moved toward said toe of said shoe, a foot engaged by said lower section will be pressed downwardly and rearwardly by said lower section with a resilient force corresponding to the force of said resilient coupling means.

17. A sport shoe according to claim 9 wherein said footbed comprises a heel receiving portion and said attaching means comprises means for attaching said heel receiving means to said heel portion of said footbed.

18. A sport shoe according to claim 10 wherein said tongue assembly attaching means comprises a pair of strap members which extend between said tongue assembly and said heel receiving means.

19. A sport shoe according to claim 12 wherein said means for adjustably attaching said tongue assembly to said instep means comprises an adjustment knob and shaft assembly operable in conjunction with said slot for adjusting the position of said tongue assembly relative to said instep means.

20. A shoe according to claim 13 wherein said means for resiliently coupling said upper and said lower sections comprises resilient material from which said upper and said lower sections are fabricated.

21. A sport shoe according to claim 15 wherein said holes comprise elongated slots extending generally along a line passing through the heel of said shoe for adjusting the position of said upper and lower sections relative to said heel of said shoe.

22. A sport shoe according to claim 15 comprising a lower shell member and an upper cuff member movably coupled to said lower shell member and wherein said holes for receiving said pin means for coupling said upper section to said sport shoe are located in the vicinity of the upper forward edge of the top of said lower shell member.

23. A shoe according to claim 16 wherein said means for resiliently coupling said upper and said lower sections comprises a resilient member and means for attaching said resilient member to said upper and said lower sections.

24. A shoe according to claim 15 wherein each of said holes comprises an elongated slot extending generally along a line passing through the heel of said shoe and a plurality of slots extending generally vertically upwardly from said elongated slot for adjusting the position of said upper and lower sections relative to said heel of said shoe.

25. A sport shoe according to claim 18 wherein said tongue assembly attaching means comprises means for movably attaching said tongue assembly to said strap members.

26. A sport shoe according to claim 22 wherein said upper shell member is located interior of the forward part of said cuff member and moves relative to said cuff member as said cuff member is moved rearwardly and forwardly relative to said lower shell member.

27. A shoe according to claim 22 wherein said means for attaching said resilient member to said upper and said lower sections comprises means for controlling the force required to change the shape of said resilient member.

28. A sport shoe according to claim 25 wherein said tongue assembly attaching means comprises a plurality of attaching means for attaching said tongue assembly to said strap members and means for attaching said tongue assembly to said strap members using selected ones of said plurality of attaching means.

29. A shoe according to claim 27 wherein said means for controlling the force required to change the shape of said resilient member comprises means for changing the location of said attaching means.

30. A shoe according to claim 29 wherein said resilient member comprises an elongated resilient member having an upper and a lower end, said attaching means comprises lower attaching means for attaching said lower end of said elongated resilient member to said lower section and upper attaching means for attaching said upper end of said elongated resilient member to said upper section and said means for changing the location of said attaching means comprises means for changing the location of said upper attaching means.

31. A shoe according to claim 30 wherein said means for changing the location of said upper attaching means comprises a removable attaching member.

32. A sport shoe having a shell, a tongue and means securing the tongue to the shoe so that it engages part of a lower extremity of the wearer of the shoe, means for moving at least a portion of the tongue in response to a predetermined movement of the wearer of the shoe, and tightening means operatively coupled to the tongue and the shoe for momentarily increasing the tightness of the fit of the shoe in response to movement of the portion of the tongue so that the predetermined movement by the wearer correspondingly tightens the fit of the shoe on the lower extremity.

33. A sport shoe according to claim 32 wherein the lower extremity includes a foot, the shoe includes a heel receiving member and the tightening means includes means for momentarily increasing the tightness of the fit of the heel receiving member on the foot in response to movement of the tongue portion.

34. A sport shoe according to claim 33 wherein the shell is substantially rigid and the tightening means is characterized in that it is at least partially defined by the shell.

35. A sport shoe according to claim 33 including means mechanically coupling the heel receiving member with the tongue.

36. A sport shoe having a shell adapted to receive a foot attached to a lower extremity of the wearer of the shoe, an elongated tongue assembly having an upper portion formed to engage and move in at least one direction with the lower leg, and a lower portion attached to the upper portion for at least partial movement therewith and shaped to engage an instep area of the foot, and means limiting movement of a center section of the tongue assembly disposed intermediate the portions so that movement of the upper portion in the at least one direction causes movement of the lower portion towards the instep area of the foot to thereby increase the tightness of the fit of the shoe on the foot as a function of the movement of the upper section in the first direction.

37. A sport shoe according to claim 36 wherein the limiting means comprises means limiting movement of the center section to a generally pivotal motion.

38. A sport shoe according to claim 36 including means defined by the tongue assembly permitting limited relative motion between the upper portion and the lower portion of the tongue assembly.

39. A sport shoe according to claim 36 wherein the limiting means is attached to the shoe.

40. A sport shoe according to claim 36 including means for securing the limiting means to a heel of the foot.

41. A sport shoe comprising a shell for holding a foot attached to a lower leg of the wearer of the shoe, an elongated tongue overlying an instep area of the foot and formed to be engaged by the lower leg; and means engaging a center section of the tongue and limiting the tongue to pivotal motions about a generally horizontal axis; whereby relative motion between the lower leg and the foot in at least one direction causes pivotal movement of the tongue and presses a portion of the tongue overlying the instep area with increasing force against the foot to thereby temporarily increase the tightness of the fit of the shoe on the foot.

42. A sport shoe comprising a movable tongue assembly for engaging a lower extremity of the wearer of the shoe, the tongue assembly being movable in response to movement of the wearer of the shoe; and means locating the tongue assembly in said shoe and effecting a momentary tightening of the fit of the shoe as the tongue assembly is moved in response to the movement of the wearer of the shoe.

43. A sport shoe according to claim 42 including means restraining the shoe to a close fit relative to the lower extremity.

44. A sport shoe according to claim 42 wherein the lower extremity includes a foot, the shoe includes a heel receiving member for the foot, and including means for momentarily tightening the fit of the heel receiving member relative to the foot as the tongue assembly is moved in response to the movement of the wearer of the shoe.

* * * * *